United States Patent [19]

Wilsher et al.

[11] Patent Number: 6,160,552

[45] Date of Patent: *Dec. 12, 2000

[54] METHOD AND APPARATUS FOR MANAGING MULTIPLE HIERARCHICAL LISTS WITHIN A BROWSER

[75] Inventors: Avril E. Hodges Wilsher, Palo Alto; Malini R. Minasandram, Mountain View, both of Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/781,583

[22] Filed: Jan. 9, 1997

[51] Int. Cl.[7] ....................................................... G06F 3/14
[52] U.S. Cl. .................................... 345/339; 345/356
[58] Field of Search ..................... 345/339, 350, 345/356, 357, 326, 335, 340, 352, 353; 395/200.33, 200.47, 200.48; 709/203, 217, 218

[56] References Cited

U.S. PATENT DOCUMENTS

| | | | |
|---|---|---|---|
| 5,283,864 | 2/1994 | Knowlton | 345/350 |
| 5,491,783 | 2/1996 | Douglas et al. | 345/335 |
| 5,491,784 | 2/1996 | Douglas et al. | 345/352 |
| 5,500,929 | 3/1996 | Dickinson | 345/356 |
| 5,515,497 | 5/1996 | Itri et al. | 345/340 |
| 5,625,781 | 4/1997 | Cline et al. | 345/335 |
| 5,727,129 | 3/1998 | Barrett et al. | 395/12 |
| 5,801,702 | 9/1998 | Dolan et al. | 345/357 |
| 5,835,089 | 11/1998 | Skarbo et al. | 345/335 |
| 5,915,096 | 6/1999 | Rosenzweig et al. | 709/227 |
| 5,933,599 | 8/1999 | Nolan | 345/330 |
| 5,960,429 | 9/1999 | Peercy et al. | 707/5 |
| 6,031,977 | 2/2000 | Pettus | 709/230 |

*Primary Examiner*—Crescelle N. dela Torre
*Attorney, Agent, or Firm*—Beyer Weaver & Thomas, LLP.

[57] ABSTRACT

Methods and apparatus for managing multiple hierarchical lists of addresses for electronic data sources, or information sites, within a browser are provided. A method for managing addresses involves displaying an address manager interface as well as a plurality of associated address list identifiers, selecting an address list identifier, and displaying a list of addresses associated with the selected address list identifier. In one embodiment, an address associated with the selected address list is placed into a second address list. In such an embodiment, the address is selected, and a cutting or copying operation is performed to place the address into a memory buffer. Then, an address list identifier which corresponds to the second address list is selected, and a paste operation is used to move the address from the memory buffer to the second address list. In another embodiment, at least one of the lists includes a plurality of address and further involves sorting the addresses according to at least one sorting criterion.

17 Claims, 9 Drawing Sheets

METHOD AND APPARATUS FOR MANAGING MULTIPLE HIERARCHICAL LISTS WITHIN A BROWSER

BACKGROUND OF THE INVENTION

1. Field of Invention

The present invention relates generally to methods and apparatus for use in browsers, and more particularly, to methods and apparatus for managing a hierarchy of lists and places within a browser using graphical user interface (GUI) controls on the screens of computer systems.

2. Background

Today, ever increasing numbers of personal computers are linked to each other through high speed data networks. The most popular network currently is the "Internet," which is the network comprising various business, academic, and personal computer sites across the globe. The popularity of the Internet, and, more particularly, that aspect of the Internet referred to as the "World Wide Web," has prompted many organizations to form internal computer networks, which are often referred to as "intranets."

The attractiveness of the World Wide Web stems in part from its highly visual character. Typically, the World Wide Web is organized into various information sites, or "web sites," which typically comprise a server that transmits data to a client computer running a "browser." The browser is software that provides a user with a window and various controls through which data from the server can be viewed and navigated. Generally, the browser includes a graphical user interface through which a user can select and view various information sites. Through the use of browsers, users can quickly navigate from one document to another and even from one information site to another using simple intuitive commands such as the activation of a mouse button. The many browsers which are available include HotJava™ (available commercially from Sun Microsystems of Mountain View, Calif.), Netscape Navigator 3.0 (available commercially from Netscape Communications Corporation of Mountain View, Calif.), and Microsoft Explorer (available commercially from Microsoft Corporation of Redmond, Wash.).

Many browsers provide the capability to locally "save," or otherwise earmark, addresses, e.g., Universal Reference Language (URL) addresses, for information sites such that the information sites can be readily accessible to a user. In other words, most browsers provide users with the utility to maintain a set of addresses which can be used to enable users to quickly sort, identify, select and view certain information sites. By way of example, Netscape Navigator 3.0 includes a "bookmark" utility that enables users to maintain a set of addresses which can be readily accessed.

The ability to locally save addresses for information sites which are of particular interest to a user is convenient, and eliminates both the need to manually enter an address into a browser interface and/or once again locate an information site when access to that information site is desired. As such, many users have a tendency to save large numbers of addresses for future access. Generally, it is difficult to efficiently organize saved addresses, as the capability to locally save addresses does not typically include any capability to create multiple hierarchical organizational structures. At the root level, e.g., the highest level of the organizational structure, provisions are made such that only a single listing can be implemented. In other words, addresses can typically only be organized within a single listing at the root level. While some browsers provide the capability for organizing addresses into nested folders and adding the names of the folders into the single listing, the use of nested folders in a single listing is non-intuitive and difficult to manage. For example, if a large number of addresses is saved, it can be difficult to locate a single address, or a group of related addresses, if a series of folders must first be identified, opened, and displayed in order to find the desired address, or if an extensive listing of addresses must be perused in order to locate the desired address.

Further, the capability to sort saved addresses, when available, does not typically enable a user to perform any type of sorting other than alphabetical sorting from "A" through "Z." While the alphabetical sorting of saved addresses can be useful, in some cases, the ability to flexibly manage the sorting of addresses, e.g., being able to sort addresses based on criteria other than the alphabet, can also be useful. For example, in the event that a user has forgotten the name of an information site but has other data, e.g., data pertaining to the frequency of his visits to the information site, alphabetically sorting saved addresses does not greatly facilitate the identification of the address which corresponds to the information site in question, but sorting by visitation frequency would be useful.

Therefore, what is desired is a method and an apparatus for creating a hierarchical structure of addresses which are locally saved within a browser environment, and a method and an apparatus for managing the hierarchical structure.

SUMMARY OF THE INVENTION

The present invention provides efficient methods and apparatus for managing multiple hierarchical lists of addresses for electronic data sources, or information sites, within a browser, or any suitable computer interface, running on an operating system. In accordance with one aspect of the present invention, a method for managing addresses involves displaying an address manager interface as well as a plurality of associated address list identifiers, selecting an address list identifier, and displaying a list of addresses associated with the selected address list identifier.

In one embodiment, an address associated with the selected address list is placed into a second address list. In such an embodiment, the address is selected, and a cutting or copying operation is performed to place the address into a memory buffer. Then, an address list identifier which corresponds to the second address list is selected, and a paste operation is used to place the address from the memory buffer to the second address list. The address is selected and dragged to an address list identifier which corresponds to the second address list in order to remove the association of the address with the selected address list and to create an association of the address with the second address list.

In another embodiment, the interface is coupled with browser software that is effective to connect a client computer with a server which has a specific electronic address, and the method includes connecting the client computer to the server and saving the electronic address for the server in one of the plurality of lists. In still another embodiment, at least one of the lists includes a plurality of addresses and further involves sorting the addresses according to at least one sorting criterion. In such an embodiment, the sorting criterion include alphabetical sorts, frequency sorts, and date sorts.

In another aspect of the present invention, a computer system configured to manage electronic data source addresses includes a processor, memory coupled with the processor, a display coupled with the processor, and an interface mechanism coupled with the processor. The processor is configured to provide an electronic data source address manager which is effective to store and manipulate addresses to electronic data sources through the use of a user interface which is displayed on the display and operated using the interface mechanism. The user interface includes a plurality of address list identifiers, each of which is associated with a list of addresses to electronic data sources and a list of addresses associated with an address list identifier that has been selected using the interface mechanism.

In one embodiment, the computer system includes an editing mechanism that is configured to change the association of an address from a first address list to a second address list. In such an embodiment, the editing mechanism is configured to remove an association between an address an associated address list and store the address in a memory buffer in response to a cut command from the interface mechanism. In another embodiment, the electronic data source address manager is coupled with a browser that is configured to establish communication between a client computer and a server computer.

In still another aspect of the present invention, a computer-readable medium includes program code devices configured to cause a computer to display an address manager interface, display a plurality of address list identifiers which are associated with a list of addresses to electronic data sources, select an address list identifier to select thereby one of the address lists, and display a list of addresses associated with the selected address list identifier. In one embodiment, program code devices are further configured to cause a computer to placee an address from the selected address list into a second address list. In another embodiment, the interface is coupled with browser software that is effective to connect a client computer with a server having a specific electronic address.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE DRAWINGS

Certain embodiments of a method and apparatus for managing multiple hierarchical lists will be described below making reference to the accompanying drawings.

The convenience of saving "places," or address designations for information sites, in a browser environment such that information sites which are identified by the places can be easily accessed is tempered by issues which can arise from a lack of a manageable hierarchical organizational structure. Although some basic organizational capabilities are included with various browser packages, the capabilities are limited to organizing places into folders which make up a single listing at the highest level of organization, i.e., at the root level. As folders can be nested, the act of locating a place in a folder that is nested within another folder can be both inefficient and non-intuitive.

A root level which enables a plurality of lists to be implemented in order to save places in a browser interface essentially serves to provide an additional level of organization over the levels which are conventionally available. In general, a list can be considered to be a wrapper for a grouping of associated folders and places. Creating an additional organizational level, or, more specifically, creating a root level at which a plurality of lists can be formed enables places and, therefore, folders, to be organized in a more intuitive manner by allowing an additional level of organization. As related places and folders can be grouped in a list which is named to reflect the contents of the list, a hierarchical organizational structure which uses lists at the root level provides for relatively easy searches to be made for specific places.

The use of lists enables the presentation, e.g., visual display, of saved places to be made in a directory format. In other words, a hierarchical organizational structure which includes a top, i.e., root, level of lists is well adapted to being easily organized and displayed in an intuitive manner. Within a browser interface, various lists and the contents of the lists can be organized such that a particular place can easily be located. The names of all lists can be displayed in addition to the contents of a selected list, thereby enabling a user to systematically view the contents of each list. Allowing contents of lists to be systematically viewed eliminates the need to open a plethora of folders which are a part of a single listing in order to locate a particular place. The search for a particular place is facilitated by the use of lists, due to the fact that an organization which uses lists is easier to manage than an organization which uses a single listing.

Figure 1:
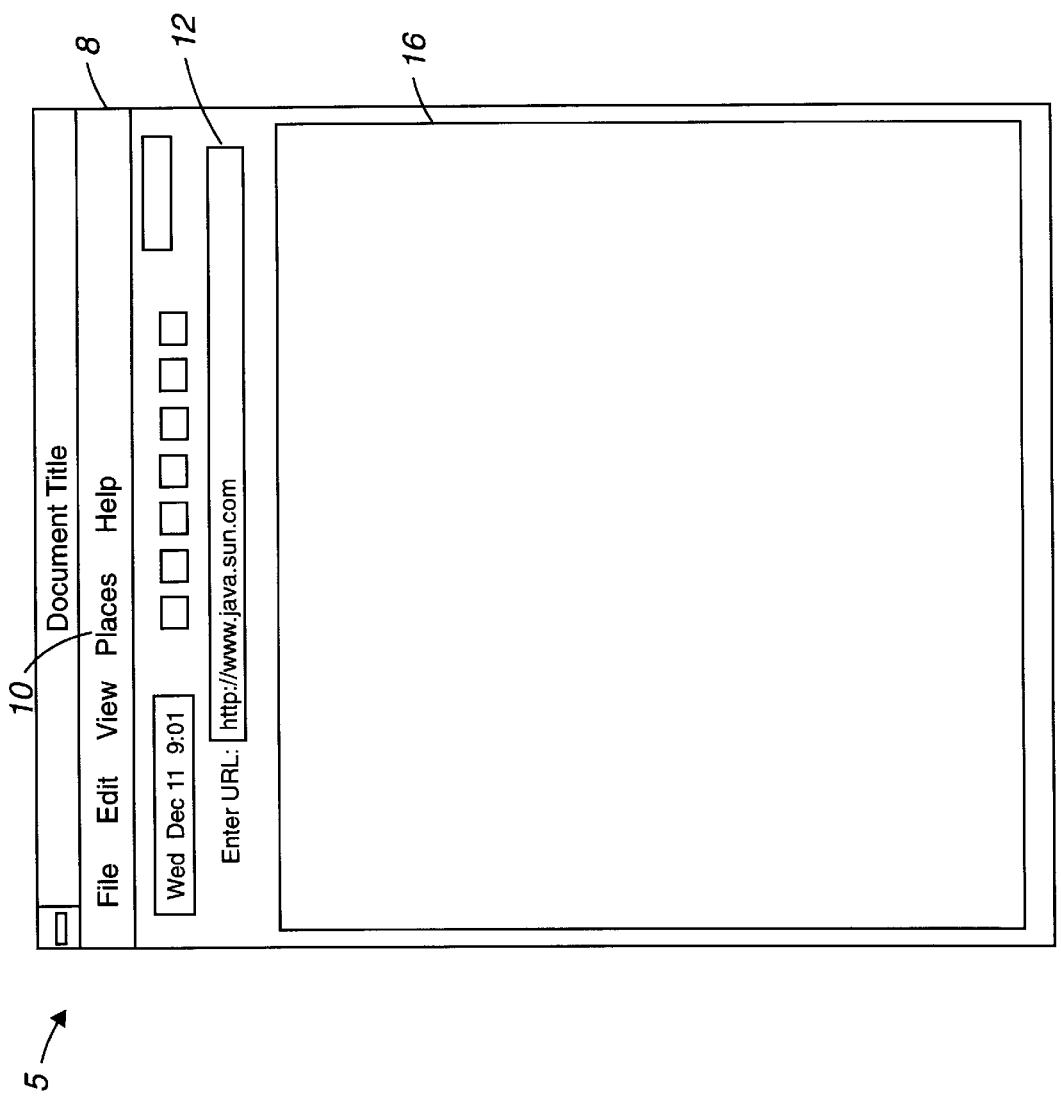
FIG. 1 is a diagrammatic representation of a browser interface in accordance with an embodiment of the present invention.

FIG. 1 is a diagrammatic representation of a browser interface in accordance with an embodiment of the present invention. As used herein, a "browser interface" is a browser with a user interface, as for example a graphical user interface (GUI). In general, a browser interface is displayed on a video monitor that is associated with a computer system. The computer system can be part of a computer network, as for example the Internet or an intranet system. Although a browser interface may take on any suitable representation, browser interface 5 is a basic representation of a HotJava™ browser interface available from Sun Microsystems of Mountain View, Calif. It should be appreciated that browser interface 5 can include a variety of different features which are not shown purely for ease of illustration.

In one embodiment, browser interface 5 includes a menubar 8 that generally provides menu items, as for example "Places" menu item 10, which can be selected by a user. When a menu item is selected, a menu is typically displayed, as will be described below with reference to FIG. 2. As will be appreciated by those skilled in the art, a menu item can be selected using any suitable input/output device. Suitable devices can include, but are not limited to, computer mice or keyboard devices. Browser interface 5 also includes a user entry box 12 in which line commands that correspond to addresses, typically Universal Reference Language (URL) addresses, of information sites, e.g., "web sites" or "web pages" on the World Wide Web, can be entered and displayed. Although URL addresses are entered and displayed in user entry box 12 in the described embodiment, in other embodiments, any suitable identifier for an information site, or an electronic data source, can be entered in user entry box 12. These addresses or identifiers can include any type of identifier which identifies an information site or a source of data, e.g., an identifier which a client computer can use to contact a server computer. By way of example, in addition to including URL addresses, the identifiers can include, but are not limited to, File Transfer Protocol (ftp) addresses. In general, information sites can be located either on the Internet or within an intranet system. Display window 16 visually displays information contained in the information site named in user entry box 12.

Figure 2:
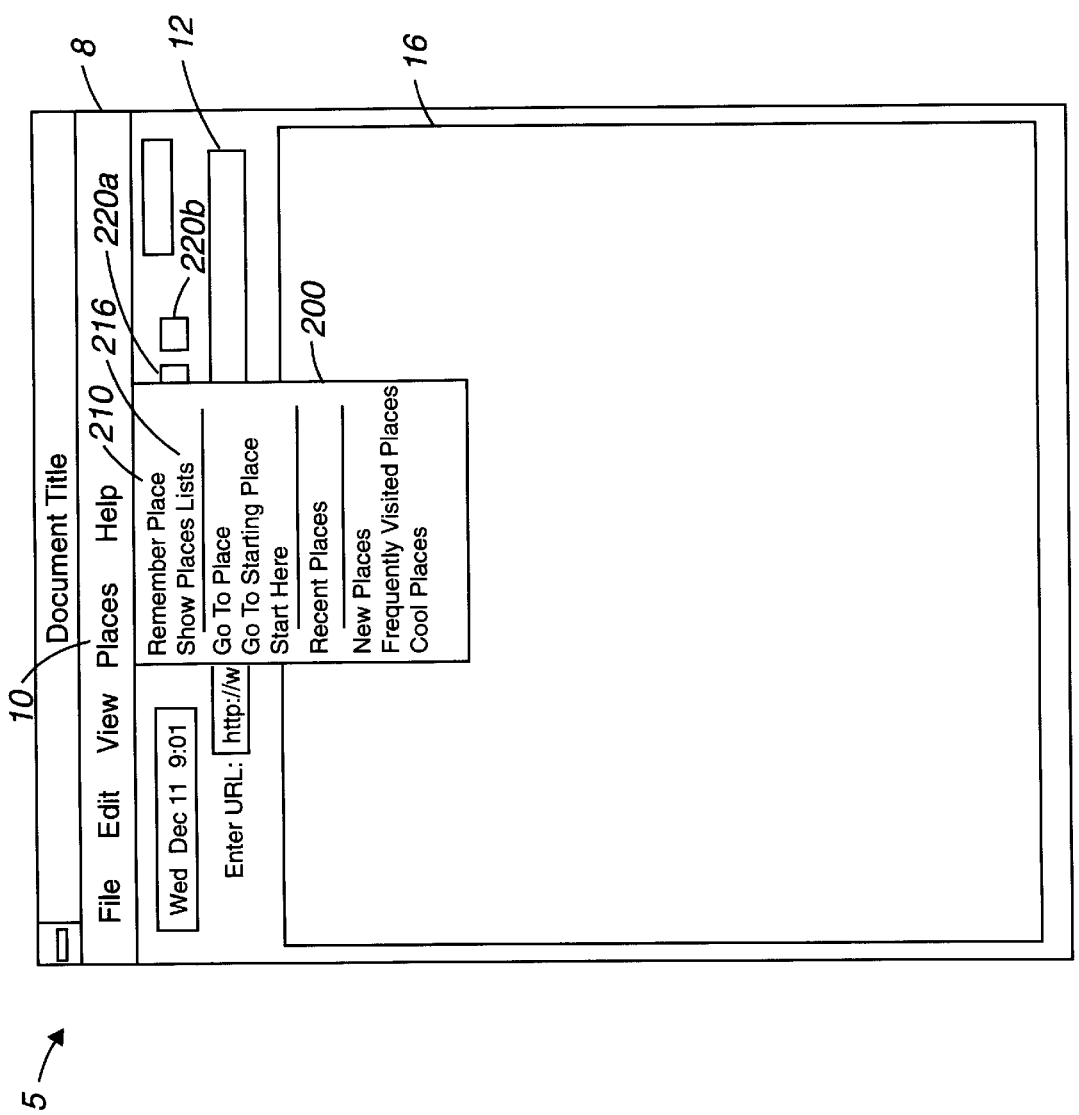
FIG. 2 is a diagrammatic representation of a browser interface with an open places menu in accordance with an embodiment of the present invention.

As mentioned above, when a menu item is selected from menubar 8, the menu that corresponds to the menu item is displayed. By way of example, when Places menu item 10 is selected from menubar 8, a Places menu is displayed. FIG. 2 is a diagrammatic representation of browser interface 5 with a Places menu that is "open," or displayed, in accordance with an embodiment of the present invention. In the described embodiment, Places menu item 10 is associated with a Places menu 200 which provides instructions that relate to cataloging information sites. Places menu 200 can generally be considered to be an address manager interface which is used to catalog, or organize, addresses which identify electronic data sources, or information sites. Places menu 200 is a pull-down menu that includes a "Remember Place" command 210 which, when selected, copies and stores the URL address entered in user entry box 12 into a list of remembered, or stored, places as described herein below.

A "Show Places Lists" command 216, also included in Places menu 200, shows the lists of remembered places which have been stored by the user. It should be appreciated that the addresses, e.g., places, which have been stored by the user using a different browser interface can be automatically imported into browser interface 5. By way of example, addresses stored using the "Bookmarks" utility of Netscape Navigator 3.0, a browser available commercially from Netscape Communications Corporation of Mountain View, Calif., can be automatically imported into browser interface 5 which, in the described embodiment is a HotJava™ browser interface. Such addresses can be imported as a list that is designated such that the addresses contained in the list can be identified as having been imported from Netscape Navigator 3.0. Similarly, addresses stored using utilities provided by older versions of a HotJava™ browser interface can also be automatically imported into a newer version of a HotJava™ browser interface, and identified accordingly.

As will be described below with reference to FIG. 3, the places lists are typically displayed in a separate window, although the places lists can be displayed in any appropriate manner. In one embodiment, buttons, as for example buttons 220a and 220b, can also be used to select the Remember Place command and the Show Places Lists command without resorting to selection of the actual menu commands. "Clicking," or selecting, buttons generally enables menu choices to be activated without requiring that a menu be opened.

Figure 3:
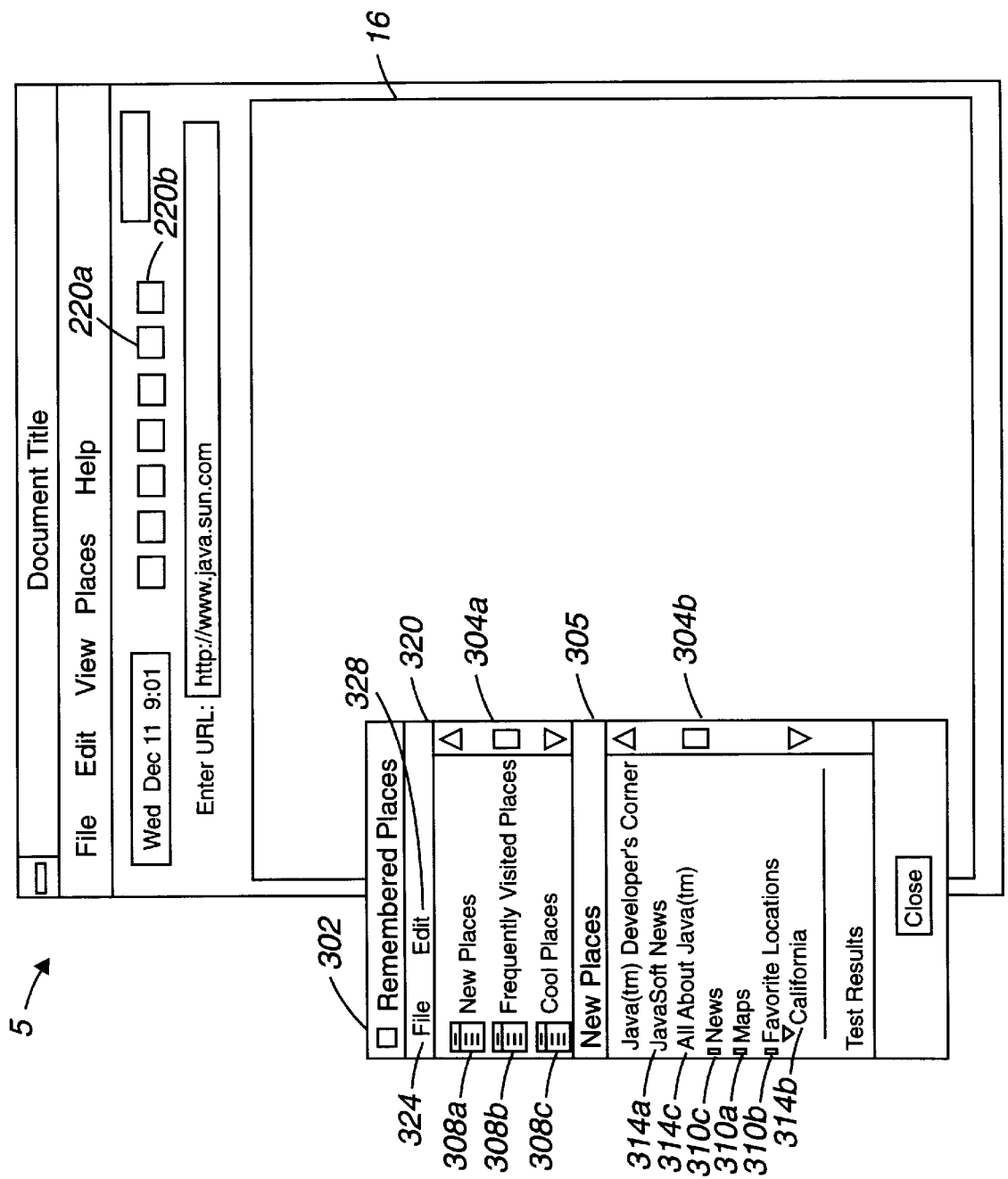
FIG. 3 is a diagrammatic representation of a browser interface with a displayed remembered places list in accordance with an embodiment of the present invention.

Referring next to FIG. 3, a remembered places list will be described in accordance with an embodiment of the present invention. Remembered Places list 302 can be activated by selecting Show Places Lists command 216 from Places menu 200 as described above with respect to FIG. 2. Alternatively, Remembered Places list 302 can be activated by selecting a button, as for example button 220b, which corresponds to Remembered Places list 302. As shown, Remembered Places window 302 is opened as a window that is separate from display window 16. In one embodiment, Remembered Places window 302 is divided into two separate display regions, e.g., fields, a top region 304a and a bottom region 304b which are separated by a divider 305. Top region 304a displays what is essentially a table of contents for lists or root directories 308a–c. In the described embodiment, lists 308a–c can include "hard-coded" lists which are provided with browser interface 5, as for example "New Places" list 308a, "Frequently Visited Places" list 308b, and "Cool Places" list 308c. In another embodiment, lists 308a–c are user-defined. As used herein, lists 308a–c will be referred to generally as lists 308.

In the illustrated embodiment, New Places list 308a contains URL addresses for the newest information sites saved by a user. As described above with respect to FIG. 2, when Remember Place command 210 is selected, a selected URL address is saved into New Places list 308a. Frequently Visited Places list 308b contains URL addresses for the information sites which are most often accessed by a user. In some embodiments, the number of information sites listed in Frequently Visited Places list 308b is fixed. By way of example, the number of information sites listed can be fixed at the ten most frequently visited information sites. In another embodiment, the number of information sites listed in Frequently Visited Places list 308b is a parameter which a user can control, i.e., the number of information sites to be listed is a variable which a user can change. In the described embodiment, Cool Places list 308c contains URL addresses for sites which, at the time browser interface 5 was installed on a computer system, were considered to be of particular interest. By way of example, within an intranet system, Cool Places list 308c can be customized to include information sites which an intranet system administrator believes are important. However, it should be appreciated that in other embodiments, the URL addresses in Cool Places list 308c can be updated periodically by a user, i.e., Cool Places list 308c can be customized by a user to reflect his or her preferences.

Bottom region 304b of Remembered Places window 302 displays the contents of a list selected from lists 308 in top region 304a. For purposes of discussion, the contents of bottom region 304b can be assumed to be associated with New Places list 308a. Bottom region 304b can display folders 310a–c, e.g., Maps folder 310a and Favorite Locations folder 310b, and places 314a–c, e.g., JavaSoft™ News place 314a, California place 314b, and All About Java™ place 314c. Folders 310 are arranged to hold sub-groupings of places 314a–c. By way of example, California place 314b is contained in Favorite Locations folder 310b which, as shown, is "open," i.e., the contents of folder 310b are displayed. Folders 310 can also be arranged to hold other folders. That is, folders 310 can be nested. While places 314a–c, herein referred to generically as places 314, are saved as addresses, as displayed in bottom region 304b, places 314 can take any form which is suitable for identifying information sites. In the described embodiment, places 314 are displayed in bottom region 304b in the form of the title name located in the header of the corresponding information site. In other embodiments, places 314 can be displayed as addresses. When information sites are saved in lists 308, it should be appreciated that places 314 which correspond to the information sites are actually saved.

When information sites are automatically saved such as in New Places list 308a as mentioned above, New Places list 308a can include many places 314, as each saved place 314 is associated with New Places list 308a until an action, e.g., an action by a user, is taken to remove a particular place 314. In order to reduce the volume of places 314 in New Places list 308a and to facilitate the organization of places 314, places 314 found in New Places list 308a can be moved or copied into other lists 308, as for example a user-created list that contains a set of related places 314. In general, places 314 can be moved or copied between any number of different lists 308. Similarly, folders 310a–c, which are referred to generically as folders 310, can also be moved or copied between different lists 308. This ability to organize places 314 into different folders 310 as well as into different lists 308 provides a user with the flexibility to organize places 314 in an intuitive manner. The process of either moving or copying places 314 between lists 308 will be described in more detail below with respect to FIG. 4.

A Remembered Places menubar 320 is a part of Remembered Places window 302. Remembered Places menubar 320 includes an Edit menu item 324 and a File menu item 328. Both Edit menu item 324 and File menu item 328 can be activated using any suitable input/output device, as for example a computer mouse. The contents of an Edit menu, which is displayed when Edit menu item 324 is activated, and a File menu, which is displayed when File menu item 328 is activated, will be discussed below with reference to FIGS. 4a and 5, respectively.

Figure 4A:
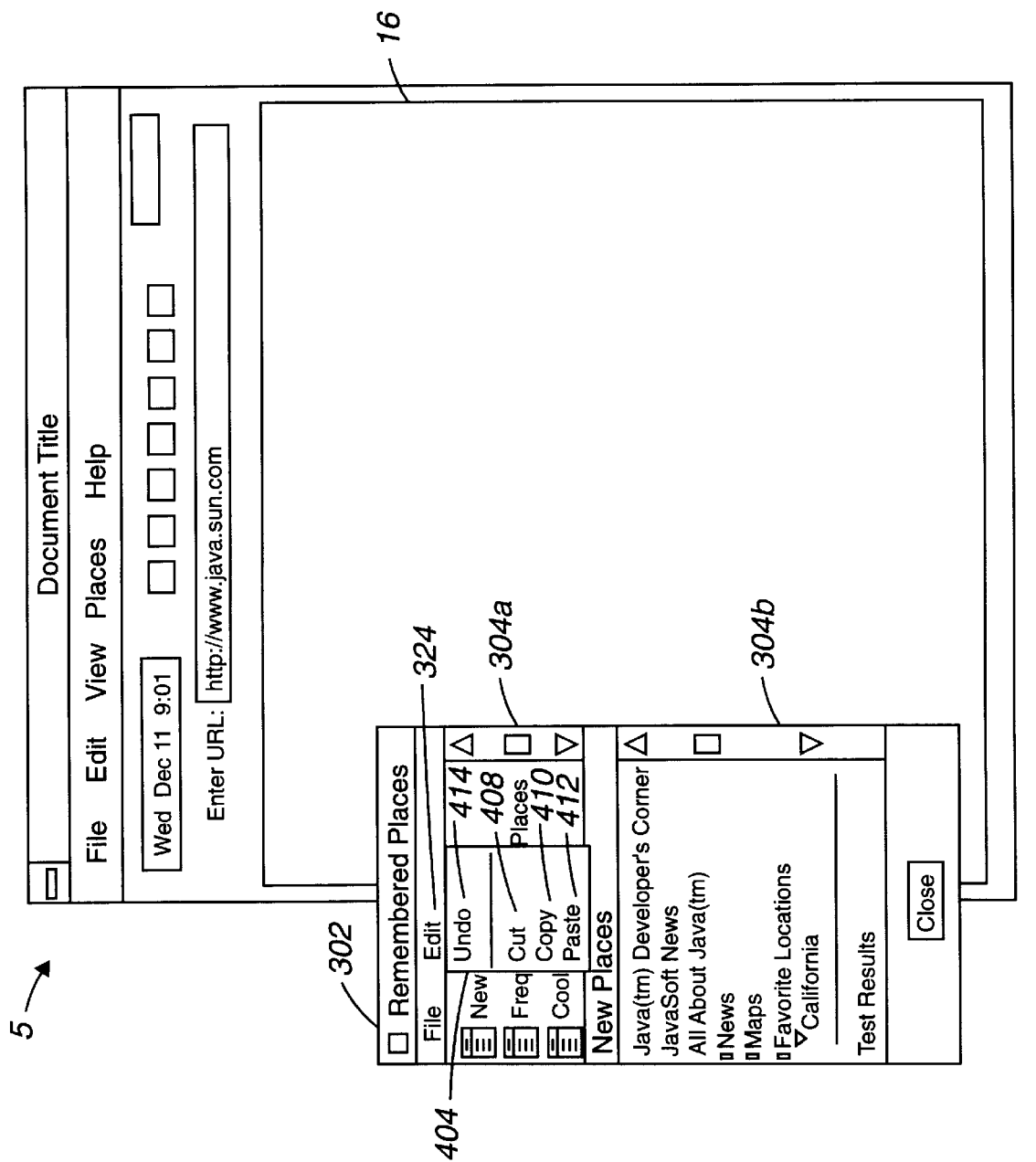
FIG. 4a is a diagrammatic representation of a browser interface with a displayed remembered places list and an open edit menu in accordance with an embodiment of the present invention.

FIG. 4a is a diagrammatic representation of Remembered Places window 302 of FIG. 3 with an open Edit menu in accordance with an embodiment of the present invention. Edit menu 404, which is opened when Edit menu item 324 is activated, includes editing features which can be used to modify the contents of Remembered Places window 302. A "Cut" command 408 can be used to remove lists 308, folders 310, or places 314 from Remembered Places window 302. By way of example, if Maps folder 310a is selected, e.g., highlighted, and Cut command 408 is activated, then Maps folder 310a is removed from Remembered Places window 302. Any lists 308, folders 310, and places 314 selected at the time Cut command 408 is activated will generally be removed. It should be appreciated that in some embodiments, in lieu of activating Cut command 408 from edit menu 402, if a keyboard is available as an input/output device, then keystrokes can also be used to initiate a Cut command.

A "Copy" command 410 can be used to copy lists 308, folders 310, or places 314 from Remembered Places window 302 into computer memory. By way of example, if Maps folder 310a is selected, and Copy command 410 is activated, then a copy of Maps folder 310a is made, generally in memory that is accessible by the computer system with which browser interface 5 is associated. As was the case for activating Cut command 408 from Edit menu 402, if a keyboard is available as an input/output device, then keystrokes can also be used to initiate a copy command.

A "Paste" command 412 can be used to add lists 308, folders 310, and places 314 to Remembered Places window 302 as appropriate. In the described embodiment, Paste command 412 is activated only when either Cut command 408 or Copy command 410 has been used. If a list 308 is selected, e.g., highlighted, in top region 304a at the time Paste command 412 is activated, but no selection is indicated in bottom region 304b, then folder 310 or place 314 that is to be pasted can be pasted anywhere in bottom region 304b. It should be appreciated that in the described embodiment, a cut or copied list 308 cannot be pasted into another list 308. Rather, a cut or copied list 308 can only be pasted into top region 304a as a new list 308.

Also in the described embodiment, when no folder 310 is selected, a pasted item, e.g., folder 310a or place 314a, will appear displayed in bottom region 304b. If a particular folder 310 is highlighted, then after the item is pasted, the item will appear in the particular folder 310. It should be appreciated that like Cut command 408 and Copy command 410, in some embodiments, Paste command 412 can also be activated using keystrokes.

Edit menu 404 further includes an "Undo" command 414. In the described embodiment, Undo command 414 is arranged to undo, or otherwise cancel, the last command which was activated from Edit menu 404. However, in other embodiments, Undo command 414 can be arranged to cancel any number of previous commands.

"Drag and drop" methods, which are well known to those skilled in the art, can also be applied to the process of cutting and pasting folders 310 and places 314 into different folders 310. In general, drag and drop methods involve the use of an input/output device, e.g., a mouse, to select and drag an item to a desired destination, at which point the item is dropped into place. In the described embodiment, in order to cut and paste a selected folder 310 or place 314 into another folder 310, the selected folder 310 or place 314 can be dragged, e.g., highlighted and moved, within bottom regions 304b. By way of example, if Favorite Locations folder 310b is to be moved into Maps folder 310a, Favorite Locations folder 310b can be selected and dragged until Maps folder 310a is also selected, e.g., highlighted, at which time Favorite Locations folder 310b is dropped into Maps folder 310a. In some embodiments, drag and drop methods can be used to copy and place, rather than cut and paste, folders 310 and places 314 into different folders 310.

Figure 4B:
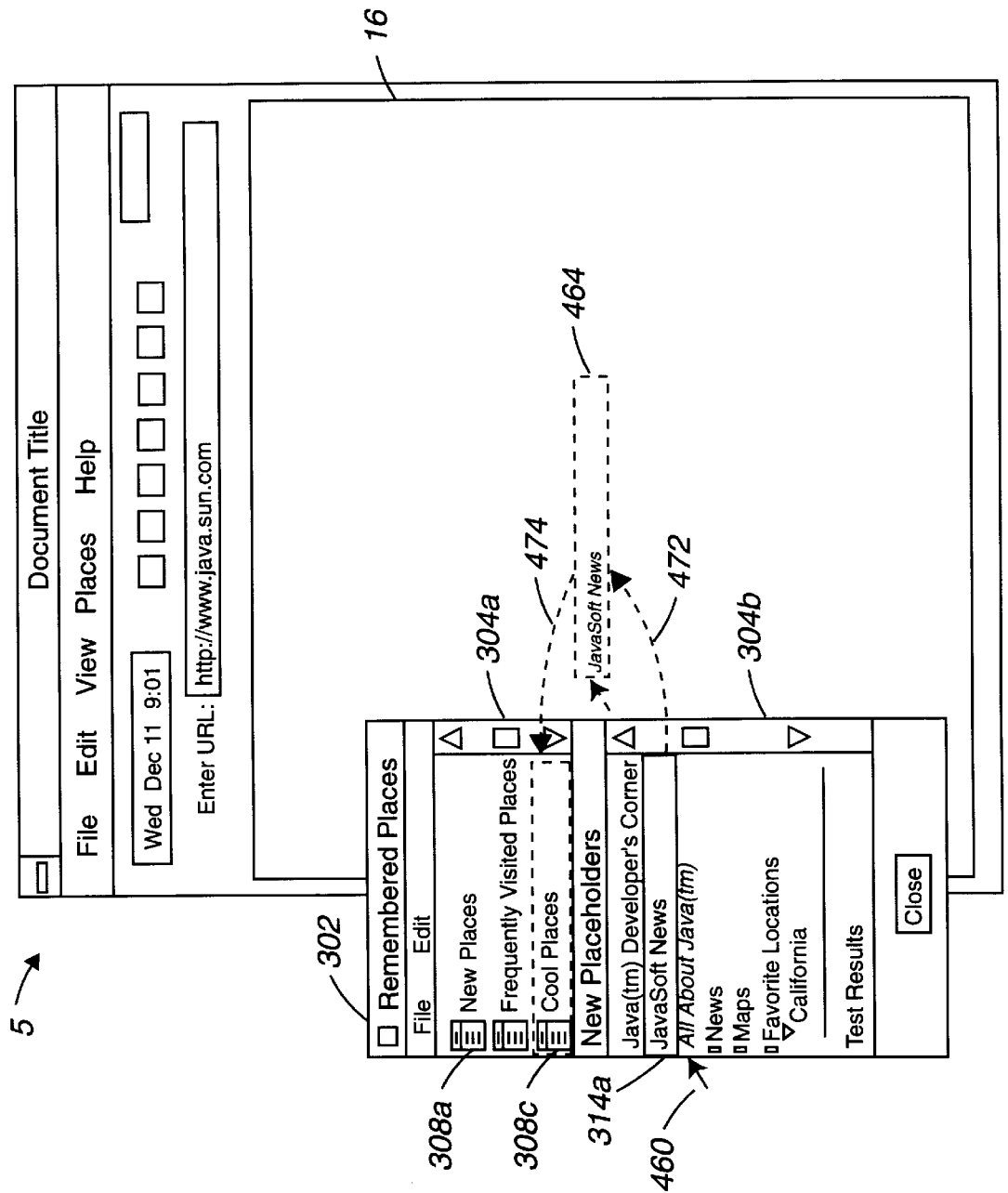
FIGS. 4b and 4c are diagrammatic representations of a browser interface with a displayed remembered places list which illustrates the cutting a place from one list and placing the place into another list in accordance with an embodiment of the present invention.
Figure 4C:
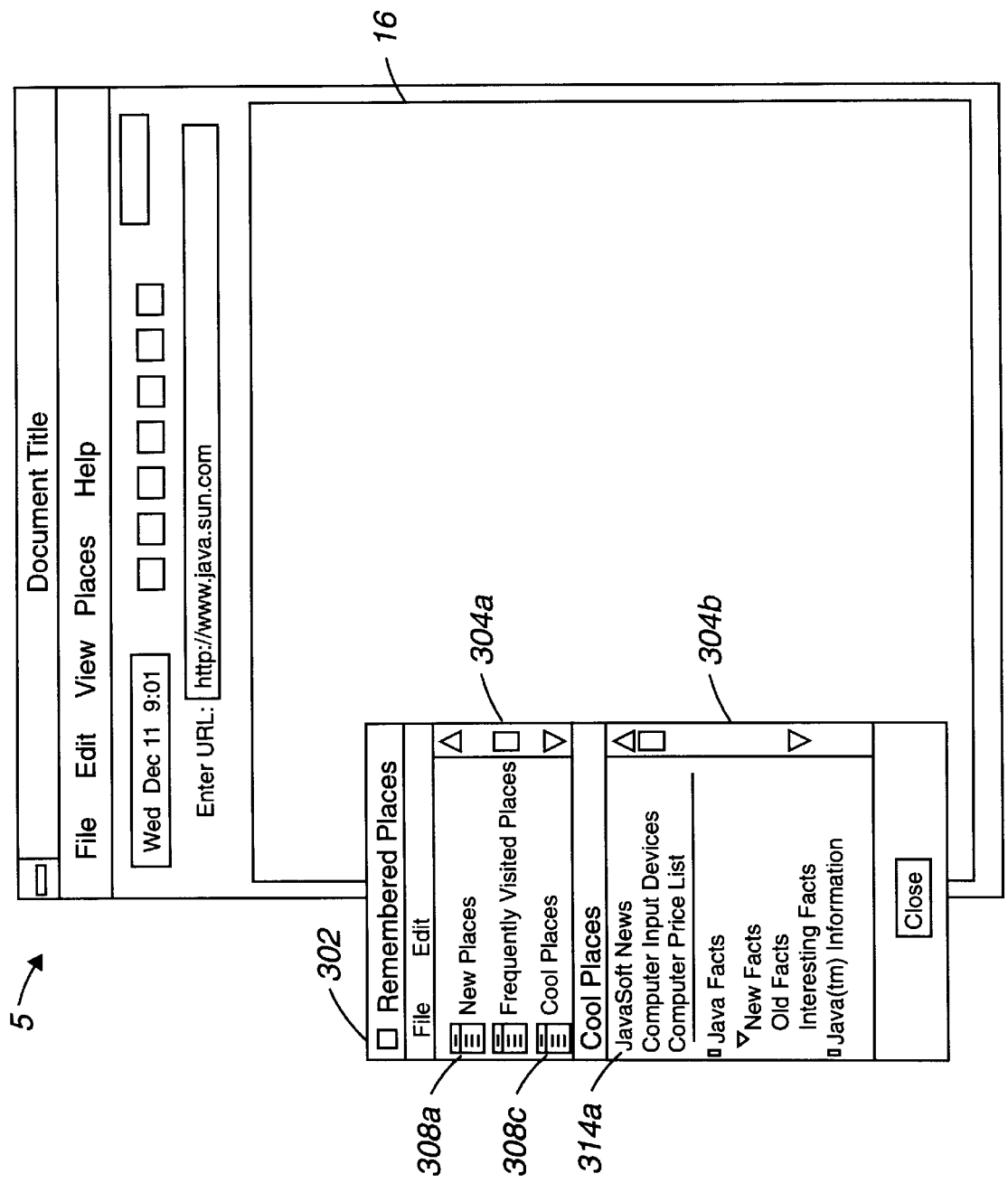

Drag and drop methods can also be used to cut and paste folders 310 and places 314 associated with a particular list 308 into another list 308. With reference to FIGS. 4b and 4c, a process of moving folders 310 and places 314 between different lists 308 will be described. To move folders 310 or places 314 into different lists, a selected folder 310 or a selected place 314 is dragged from bottom region 304b into top region 304a, where the selected folder 310 or the selected address file 314 is dropped, e.g., placed, into a selected list 308. If no list 308 is selected in top region 304a when the selected folder 310 or the selected address file 314 is dropped, then in the described embodiment, the selected folder 310 or selected address file 314 is not moved. In another embodiment, however, if no list 308 is selected, when the selected folder 310 or selected address file 314 is dropped in top region 304a, the selected folder 310 or selected address file 314 can be pasted into New Places list 308a.

As shown in FIG. 4b, which is a diagrammatic representation of Remembered Places menu 302 in accordance with an embodiment of the present invention, JavaSoft™ News place 314a, which, as previously mentioned, is associated with New Places list 308a, is highlighted using a cursor 460. In order to move JavaSoft™ News place 314a into Cool Places list 308c, JavaSoft™ News place 314a is dragged, e.g., a "virtual representation" 464 of JavaSoft™ News place 314a is moved, as indicated by arrows 472 and 474, from bottom region 304b into top region 304. As will be appreciated by those skilled in the art, moving JavaSoft™ News place 314 into Cool Places list 308c involves providing JavaSoft™ News place 314, i.e., an address, to a memory buffer of a computer with which browser interface 5 is associated. Once cursor 460 highlights Cool Places list 308c, JavaSoft™ News place 314a is placed in Cool Places list 308c, as shown in FIG. 4c. FIG. 4c is a diagrammatic representation of a Remembered Places menu 302 with bottom region 304b which displays the contents of Cool Places list 308c in accordance with an embodiment of the present invention. In the described embodiment, JavaSoft™ News place 314a, which has been dragged from New Places List 308a and dropped into Cool Places list 308, is automatically listed at the top of bottom region 304b.

Figure 5:
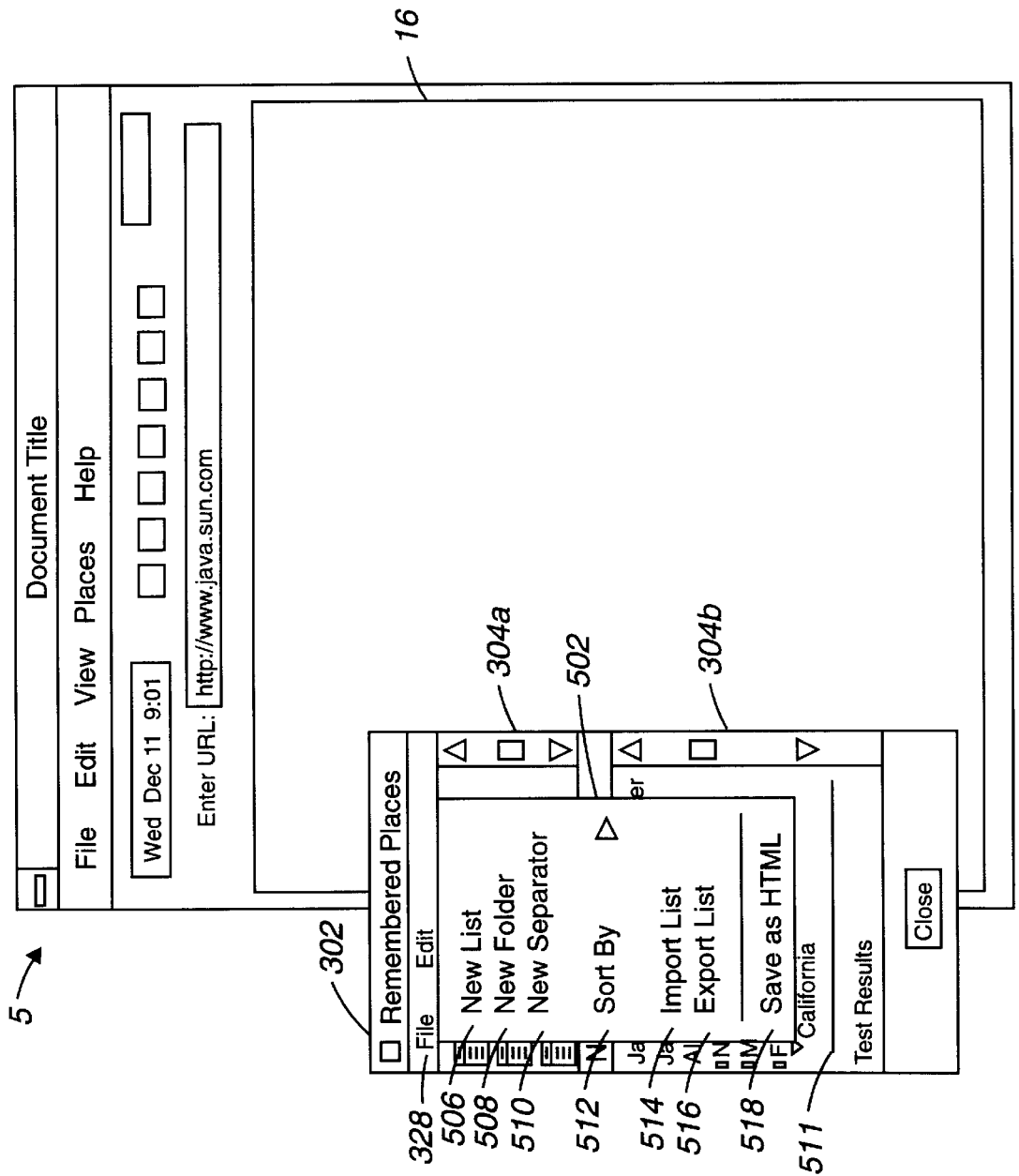
FIG. 5 is a diagrammatic representation of a browser interface with a displayed remembered places menu and an open file menu in accordance with an embodiment of the present invention.

Referring next to FIG. 5, a File menu will be described in accordance with an embodiment of the present invention. As mentioned above with respect to FIG. 3, when File menu item 328 is activated in Remembered Places Window 302, a File menu is displayed. In the embodiment as shown, File menu 502 includes a "New List" command 506 which, when activated, creates a new list that appears in top region 304a. A "New Folder" command 508 can be activated to create a new folder. If there is a selected list 308 that is open, i.e., a selected list 308 with contents displayed in bottom region 304b, then any new folder that is created is added to the contents of the selected list 308. If there is no selected list 308, then newly created folders can be added to any specified, or default, list 308. Although an error message is displayed in the described embodiment if there is no specified list 308, in some embodiments, in the event that there is no selected list 308, newly created folders are automatically added to New Places list 308a.

A "New Separator" command 510 is used to add separators, as for example separator 511, in bottom canvas 304b. As shown, separator 511 appears as a line between California place 314b and Test Results place 314c. Separator 511 generally serves to visually divide the contents of bottom region 304b for readability purposes as desired by a user. A "Sort By" command 512 activates a sorting menu which provides options that can be selected to sort the contents of lists 308, as will be described below with respect to FIG. 6.

In the described embodiment, File menu 502 includes an "Import List" command 514 and an "Export List" command 516 which can be used to import and export lists, saved in any suitable file format, as for example a hypertext mark-up language (HTML) file format, to and from other browsers. A "Save as HTML" command 518 is arranged to enable a user to save a list, as for example New Places list 308a, as an HTML file which can be used in conjunction with an information site, e.g., a Web site. It should be appreciated that Save as HTML command 518 serves the same general purpose as Export List command 516.

Figure 6:
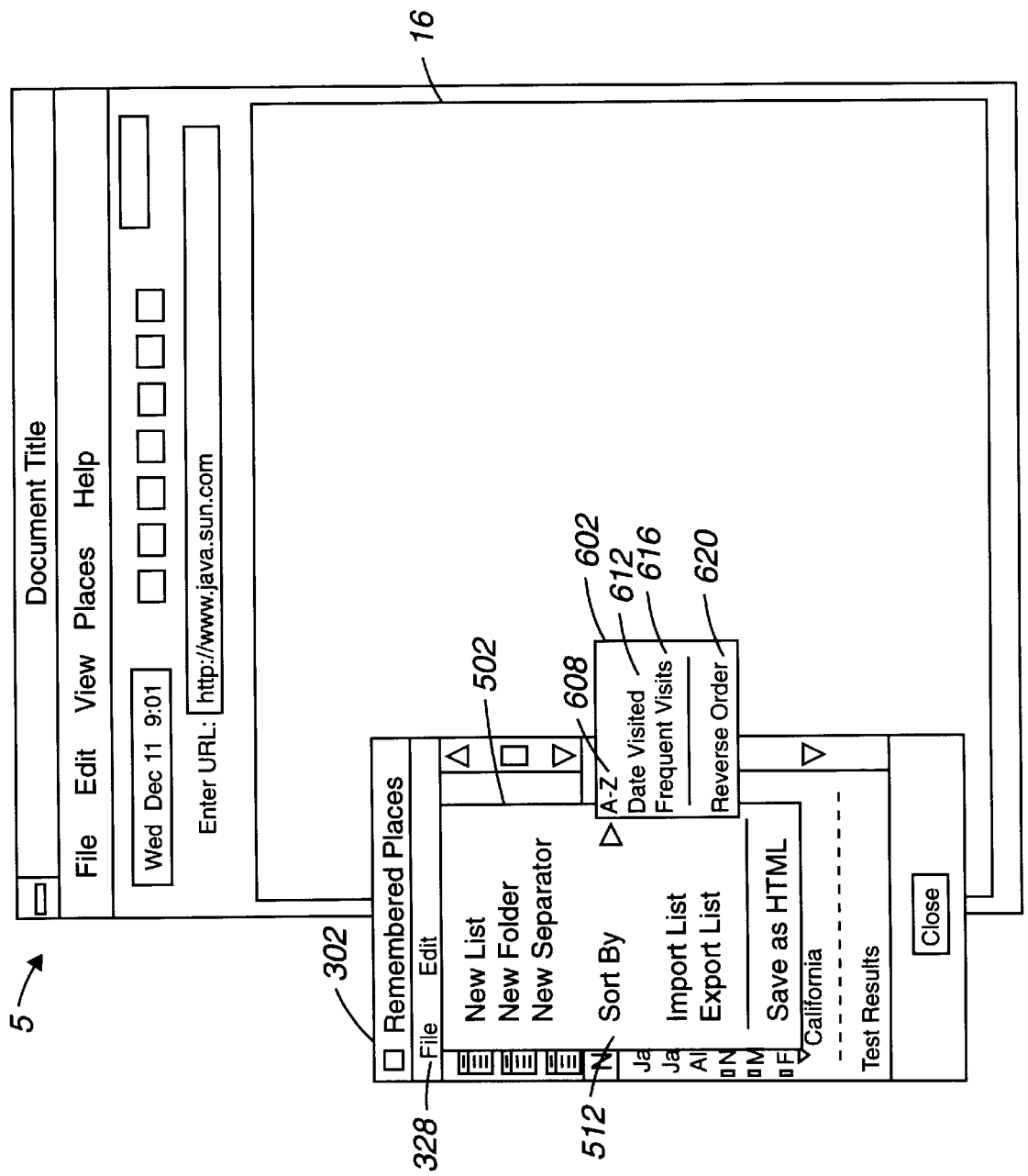
FIG. 6 is a diagrammatic representation of a browser interface with a displayed remembered places menu, an open file menu, and a list of sorting options in accordance with an embodiment of the present invention.

With reference to FIG. 6, options for sorting the contents of lists will be described in accordance with an embodiment of the present invention. A menu of Sorting options 602 is displayed when Sort By command 512 is activated from File menu 502. A list, e.g., New Places list 308a, can be selected such that the contents of the list can be sorted. If a particular folder 310 within the list is selected to be sorted, then the contents of the particular folder 310 are sorted. If there is no folder 310 selected, then the contents of the selected list 308 are sorted. While any appropriate sorting options can be included in menu of Sorting options 602, the sorting options generally include alphabetical, date, and frequency options.

An "A–Z" sorting option 608 involves alphabetically sorting contents of either a selected list 308 or a selected folder 310 within the selected list 308. A "Date Visited" sorting option 612 allows contents of a selected list 308 or a selected folder 310 to be sorted using information pertaining to the most recent date a particular place 314 was visited. In other words, the dates on which given places 314 were last accessed are generally recorded using a date signature, and Date Visited sorting option 612 enables places 314 and folders 310 to be sorted based upon the dates. It should be appreciated that the date on which a given folder 310 was last accessed corresponds to the most recent date on which any individual place 314 associated with the given folder 310 was accessed. Generally, Date Visited Sorting option 612 sorts places 314 and folders 310 such that the most recently visited place 314 or folder 310 in a given list 308 is listed at the top of the contents of the list 308. As information regarding the number of visits made to a particular place 314 or a particular folder 310 are available in the described embodiment, a "Frequent Visits" sorting option 616 enables the contents of a selected list 308 or a selected folder 310 to be sorted such that the most frequently visited place 314 or folder 310 is listed at the top of selected list 308 or folder 310 as appropriate.

A "Reverse Order" sorting option 620 serves the purpose of reversing the order in which places 314 and folders 310 are sorted. By way of example, after the contents of a list, as for example New Places list 308a, are sorted using A–Z sorting option 608, Reverse Order sorting option 620 can be used to list the contents of new places list 308a in reverse order. That is, Reverse Order sorting option 620 can be used essentially to alphabetically sort the contents of New Places list 308a from "Z" to "A." After the contents of a selected list 308 or folder 310 are sorted using Date Visited sorting option 612, Reverse Order sorting option 620 can be used to re-sort the contents of the selected list 308 or folder 310 such that the least frequently accessed folder 310 or place 314 is listed first. Similarly, after the contents of a selected list 308 or folder 310 are sorted using Frequent Visits sorting option 616 such that the most frequently visited place 314 or folder 310 is listed at the top of the contents of selected list 308 or folder 310, Reverse Order sorting option 620 can be used to reverse the order in which places 314 and folders 310 are listed.

It should be appreciated that selecting Reverse Order sorting option 620 merely serves to reverse the order in which contents of a particular list 308 are listed. By way of example, if contents are listed in reverse alphabetical order, i.e. from "Z" to "A," selecting Reverse Order sorting option 620 will result in the contents being listed from "A" to "Z." In some embodiments, Reverse Order sorting option 620 can be used to reverse the order in which the contents of a particular list 308 or folder 310 are listed, without having to first select an alternate sorting option, e.g., A–Z sorting option 608, Date Visited Sorting option 612, or Frequent Visits Sorting option 616.

Although neither sorting capabilities nor drag and drop capabilities are available with regards to lists 308 in the described embodiment, it should be appreciated that in some embodiments, in addition to being able to sort the contents of lists 308, lists 308, themselves, can also be sorted. In one such embodiment, lists 308 can be manually sorted, i.e., a user can move lists 308 within top region 304a of Remembered Places menu 302, to reflect the preferences of the user. In another such embodiment, lists 308 can be sorted by selecting sorting options, as for example an alphabetical sorting option, a date visited sorting option, or a frequent visits sorting option, such that lists 308 can be sorted much like contents of lists 308 are sorted.

Figure 7:
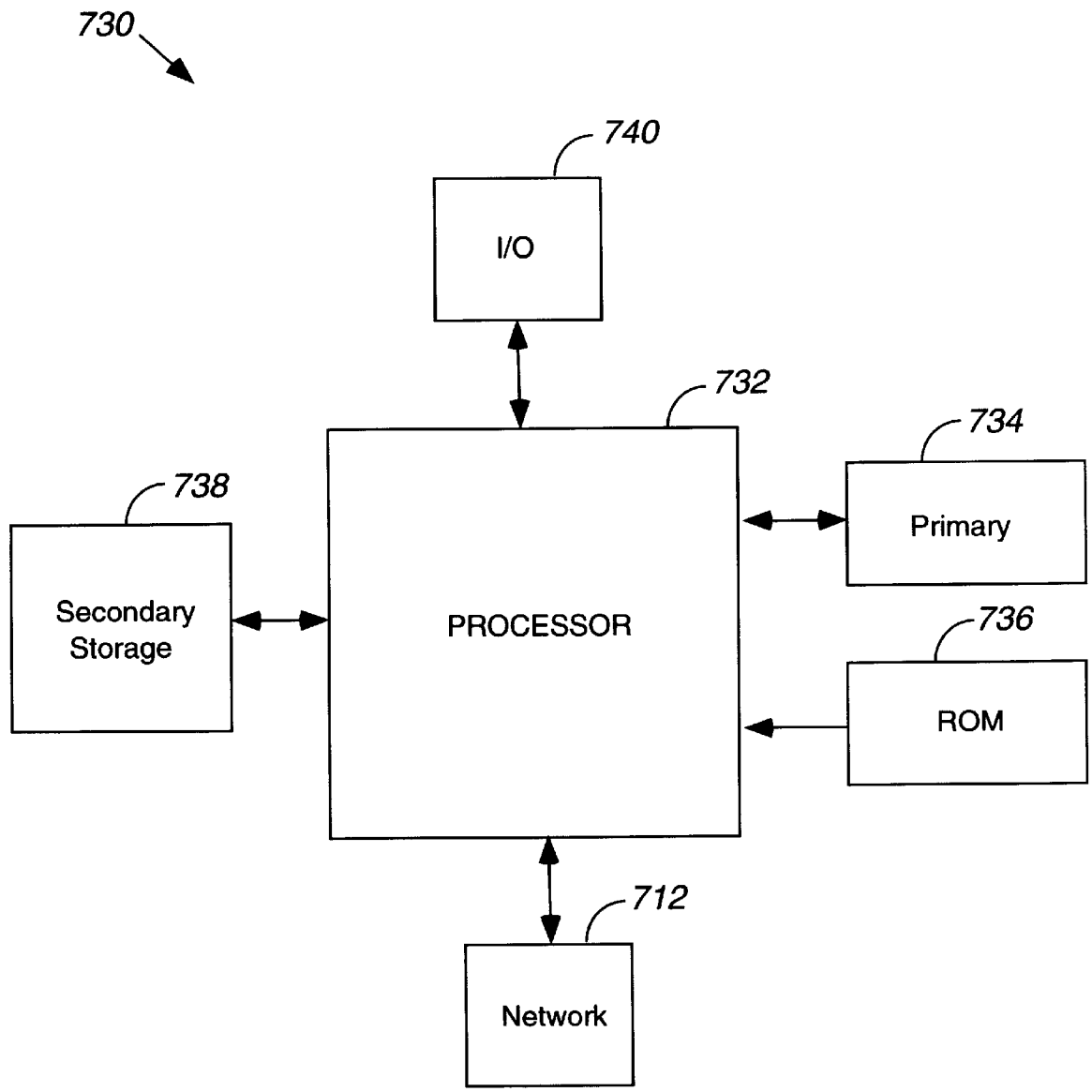
FIG. 7 is a diagrammatic representation of a computer system in accordance with the present invention.

FIG. 7 illustrates a typical computer system in accordance with the present invention. The computer system 730 includes any number of processors 732 (also referred to as central processing units, or CPUs) that are coupled to memory devices including primary storage devices 734 (typically a read only memory, or ROM) and primary storage devices 736 (typically a random access memory, or RAM). As is well known in the art, ROM 734 acts to transfer data and instructions uni-directionally to the CPU 732, while RAM 736 is used typically to transfer data and instructions in a bi-directional manner. Both primary storage devices 734, 736 may include any suitable computer-readable media. A mass memory device 738 is also coupled bi-directionally to CPU 732 and provides additional data storage capacity. The mass memory device 738 may be used to store programs, data and the like and is typically a secondary storage medium such as a hard disk that is slower than primary storage devices 734, 736. Mass memory storage device 738 may take the form of a magnetic or paper tape reader or some other well-known device. It will be appreciated that the information retained within the mass memory device 738, may, in appropriate cases, be incorporated in standard fashion as part of RAM 736 as virtual memory. A specific mass storage device such as a CD-ROM 734 may also pass data uni-directionally to the CPU.

CPU 732 is also coupled to one or more input/output devices 140 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 732 optionally may be coupled to a computer or telecommunications network, e.g., an Internet network or an intranet network, using a network connection as shown generally at 712. With such a network connection, it is contemplated that the CPU 732 might receive information from the network, or might output information to the network. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, although the Remembered Places window has been described as being a part of a browser interface, the Remembered Places window, or an address manager interface, in general, can be associated with a user interface which is not associated with a browser interface.

Further, although a Remembered Places window has been described as being a separate window which is divided into a top portion and a bottom portion, the Remembered Places window can take on any suitable form. By way of example, top portion and bottom portion of Remembered Places window can be displayed as separate windows.

In addition, it should be appreciated that the lists provided with the browser interface can be widely varied. Lists can be added and deleted without departing from the spirit or the scope of the present invention. For instance, the browser interface can be provided with only the New Places list and the Cool Places list, i.e., Frequently Visited Places list can be eliminated. Similarly, menu options in the different menus can also be widely varied, as options can be added and deleted in accordance with the requirements of a particular interface. By way of example, the Save as HTML option can be deleted from the File menu associated with the Remembered Places window. Therefore, the described embodiments should be taken as illustrative and not restrictive, and the invention should be defined by the following claims and their full scope of equivalents.

We claim:

1. A method for managing addresses to data sources associated with a browser environment, the browser environment being in communication with an Internet environment, the Internet environment including the World Wide Web, the method comprising:

displaying an address manager interface associated with the browser environment;

displaying a plurality of address list identifiers, each of said address list identifiers being associated with a list of indicators selected from a plurality of lists of indicators, the indicators including addresses to data sources associated with the Internet environment, the data sources including websites associated with the World Wide Web, the indicators further including at least one address sub-list identifier, the at least one address sub-list identifier being associated with a sub-list of addresses to data sources associated with the Internet environment, wherein the plurality of address list identifiers includes a first address list identifier which is associated with a first list of indicators that includes addresses that are accessed through the address manager interface, the number of addresses within the first list of indicators being substantially limited to a maximum limit;

selecting one of said plurality of said address list identifiers to select thereby one of said plurality of lists of indicators; and displaying the list of indicators associated with said selected address list identifier.

2. The method as recited in claim 1 further including setting the maximum limit.

3. The method as recited in claim 2 wherein the predetermined limit is set by a user.

4. The method as recited in claim 1 wherein the first list of indicator includes addresses that are frequently accessed through the address manager interface.

5. A method for managing addresses to data sources associated with a browser environment, the browser environment being in communication with an Internet environment, the Internet environment including the World Wide Web, the method comprising:

displaying an address manager interface associated with the browser environment;

displaying a plurality of address list identifiers within the address manager interface, each of the address list identifiers being associated with a corresponding list of indicators selected from a plurality of lists of indicators, the indicators including addresses to data sources associated with the Internet environment, the data sources including websites associated with the World Wide Web, the indicators further including at least one address sub-list identifier, the at least one address sub-list identifier being associated with a sub-list of addresses to the data sources, wherein the plurality of address list identifiers include a first address list identifier which is associated with a first list of indicators that includes only addresses characterized as being frequently accessed by the address manager interface and a second address list identifier which is associated with a second list of indicators that includes addresses characterized as being recently added to address manager interface by a user;

selecting one of the plurality of the address list identifiers to select thereby one of the plurality of lists of indicators; and displaying the list of indicators associated with the selected address list identifier.

6. A method for managing addresses to data sources as recited in claim 5 wherein the browser environment is further in communication with an intranet environment.

7. A method for managing addresses to data sources as recited in claim 5 wherein the first list of indicators that includes addresses characterized as being frequently accessed through the address manager interface are substantially automatically identified by the address manager interface.

8. A method for managing addresses to data sources as recited in claim 5 further including:

selecting an indicator from the list of indicators associated with the selected address list identifier;

performing one of a cut operation and a copy operation to place the selected indicator into a memory buffer;

selecting an address list identifier associated with a third list of indicators from the plurality of address list identifiers; and performing a paste operation to place the selected indicator from the memory buffer into the third list of indicators.

9. A method for managing addresses to data sources as recited in claim 5 further including sorting the list of indicators associated with the selected address list identifier using a sorting criterion selected from the group consisting of an alphabetical criterion, a frequency of selection criterion, and a time-based criterion.

10. A method for managing addresses to data sources as recited in claim 5 wherein the addresses to data sources associated with the Internet environment include Universal Reference Language (URL) addresses.

11. A method for managing addresses to data sources as recited in claim 5 wherein the first list of indicators associated with the first address list identifier is determined by the address manager interface, and the second list of indicators associated with the second address list identifier is automatically determined by the address manager interface.

12. The method as recited in claim 5 wherein the second list of indicators includes only addresses characterized as being recently added to address manager interface by a user.

13. A method for managing addresses to data sources associated with a browser environment, the browser environment being in communication with an intranet and the World Wide Web, the method comprising:

displaying an address manager interface associated with the browser environment;

displaying a plurality of address list identifiers within the address manager interface, each of the address list identifiers being associated with a list of indicators selected from a plurality of lists of indicators, the indicators including addresses to websites associated with the World Wide Web and at least one address sub-list identifier, the at least one address sub-list identifier being associated with a sub-list of addresses to websites; and saving a new indicator using the address manager interface, the new indicator not being previously included in any of the plurality of lists of indicators, wherein the address manager interface saves the new indicator into a first list of indicators selected from the plurality of lists of indicators that is associated with a first address list identifier, the first list of indicators including only indicators which were most recently saved by a user using the address manager interface.

14. A method for managing addresses to data sources as recited in claim 13 further including:

selecting one of the plurality of the address list identifiers to select thereby one of the plurality of lists of indicators; and displaying the list of indicators associated with the selected address list identifier.

15. A method for managing addresses to data sources as recited in claim 13 wherein the indicators further include addresses to data sources associated with the intranet.

16. A method for managing addresses to data sources as recited in claim 15 wherein at least one list of indicators selected from the plurality of lists of indicators includes both addresses to websites associated with the World Wide Web and addresses to data sources associated with the intranet.

17. A method for managing addresses to data sources as recited in claim 13 further including:

selecting the first address list identifier to select thereby the first list of indicators;

displaying the first list of indicators associated with the first address list identifier;

selecting the new indicator from the first list of indicators;

performing a cut operation to place the new indicator into a memory buffer;

selecting an address list identifier from the plurality of address list identifiers to select thereby a list of indicators associated with the selected address list identifier; and performing a paste operation to place the new indicator into the selected list of indicators.

* * * * *